United States Patent [19]

Hill et al.

[11] 4,226,434
[45] Oct. 7, 1980

[54] HAND TRUCK

[76] Inventors: Benjamin J. Hill, 12115 E. 21st Ct., Tulsa, Okla. 74129; Norman L. Wagnon, 8511 E. 122nd St. S., Bixby, Okla. 74008

[21] Appl. No.: 935,331

[22] Filed: Aug. 21, 1978

[51] Int. Cl.² ............................................. B62B 1/12
[52] U.S. Cl. ............................. 280/47.21; 414/490
[58] Field of Search ........................... 414/490, 444; 280/47.13 R, 47.17, 47.18, 47.2, 47.21, 47.24, 47.27

[56] References Cited

U.S. PATENT DOCUMENTS

| 1,227,875 | 5/1917 | Brickel | 280/47.21 |
| 2,096,994 | 10/1937 | Millen | 280/47.21X |
| 2,521,819 | 9/1950 | Baer | 280/47.13 R X |

FOREIGN PATENT DOCUMENTS

| 228709 | 8/1963 | Austria | 280/47.21 |
| 1578137 | 4/1969 | France | 280/47.21 |

Primary Examiner—Stephen G. Kunin
Assistant Examiner—Terrance L. Siemens

Attorney, Agent, or Firm—Head & Johnson

[57] ABSTRACT

A hand truck for lifting and moving heavy objects on a floor surface, the truck having a frame with spaced apart handles at the upper end, a toe plate affixed to the lower end of the frame extending generally normal to the frame, the rear lower edge of the toe plate forming a pivot junction with the frame, an axle arm affixed to the lower end of the frame on the side opposite the toe plate supporting an axle having spaced apart wheels, the axle arm allowing the axle to pivot relative to the frame, support brackets affixed to the frame rearward surface, the support brackets extending to engage the axle when the frame is rearwardly pivoted and arranged such that rearward movement of the upper end of the frame first pivots the toe plate from engagement with the floor about the pivot junction and then lifts the toe plate, and any load supported thereon, off the floor, while nevertheless allowing the wheels to at all times remain in contact with the floor, and a catch arm pivotally attached to the frame and having a hook portion to releasably engage the axle to retain the frame in the upright position.

1 Claim, 5 Drawing Figures

HAND TRUCK

BACKGROUND AND OBJECTS OF THE INVENTION

The use of hand trucks for moving heavy weights about a floor surface is well known. Hand trucks normally consist of a frame with a toe plate extending forwardly at the lower end of the frame for positioning under a load to be moved. The frame has wheels rotated about an axle affixed to the frame so that by pivoting the upper end of the frame rearwardly relative to the wheels, any weight positioned on the toe plate is lifted and moved about the floor surface. A problem existing with the typical hand truck in use today is that the wheel axle is normally affixed to the truck frame and arranged so that immediately upon pivoting the frame rearwardly relative to the wheels, the toe plate leaves the floor, thus putting the entire weight to be lifted on the frame. In addition, since the weight is immediately lifted off the floor, all weight is supported by the wheels so that when the user attempts to lift a load by first moving the upper end of the frame rearwardly relative to the wheels, there is a tendency for the hand truck to roll backwards. To prevent this, the usual procedure is for the operator to place his foot against the wheel axle to apply force on the lower end of the frame so that it can be pivoted backward sufficiently to balance the load over the wheels of the truck for movement.

The present invention is directed towards an improvement in existing hand trucks. Particularly, the present invention is concerned with a means of providing a hand truck in which the toe plate and the frame form a pivot junction. When the toe plate is positioned under a load to be lifted and the operator moves the upper end of the frame rearwardly, the toe plate is pivoted about a fixed, non-movable pivot so that the weight to be lifted is shifted rearwardly. After movement through a preselected angle, the axle is engaged by the frame and the load then shifted onto the axle and the wheels. In this manner, the hand truck permits an operator to position the toe plate under a load and pull the upper end of the frame rearwardly to shift the load onto the toe plate before the total weight of the load is lifted by the wheels. The advantages eliminate the need to brace the hand truck against rearward movement when the weight is first lifted.

It is therefore an object of this invention to provide an improved hand truck. More particularly, an object of this invention is to provide a hand truck having wheels supported by an axle which is pivotally attached to the truck frame and arranged such that a pivot junction is achieved between the toe plate and frame of the truck permitting loads to be moved by the truck to be first shifted rearwardly before the entire load is lifted onto the wheels, making it easier for an operator to shift the center of gravity of a load to be moved onto the truck with the application of reduced rearward force on the upper end of the frame and, at the same time, eliminating the necessity that the operator place one foot against the axle to prevent rearward movement of the truck when a load is being shifted onto it.

Another particular object of this invention is to provide a hand truck wherein the wheels are supported on an axle pivoted to the truck frame and arranged so that the wheels are always in engagement with the floor surface on which the truck is used and including a catch means to insure that the truck will stand in an upright position.

These general objects, as well as other and more specific objects of the invention, will be fulfilled in the following description and claims, taken in conjunction with the attached drawings.

SUMMARY OF THE INVENTION

A hand truck is provided for lifting and moving heavy loads about a floor surface. The truck includes a frame having spaced apart handles at the upper end adapted for engagement by the hands of the operator whereby the frame of the truck may be pivoted forward and backward to load or unload objects, and for movement of the truck about the floor surface. The frame has a forward and rearward surface, the loads being supported on the forward surface. A toe plate is affixed to the lower end of the frame and extends generally normal of the frame forward surface. The toe plate and frame rearward surface form a pivot junction. The toe plate is configured and adapted to slide under objects to be lifted and moved. The pivot junction provides non-sliding engagement with the floor surface when the frame is pivoted rearwardly. An axle is provided having a pair of spaced apart wheels for use in moving loads supported by the frame about a floor surface. The axle is pivotally supported by arm means which are pivotally attached at their inner ends to the frame rearward surface at a point spaced above the pivot junction. The wheel axle is affixed to the arm outer end and thereby the wheel axle is parallel to the pivot junction. The pivotal support of the wheel axle means that the wheels always remain on the floor surface regardless of the angle of pivotation of the frame relative to the floor surface. Affixed to the rearward surface of the frame are support brackets which extend rearwardly to move the toe plate relative to the floor a preselected angle. Further rearward movement of the upper end of the frame after the support brackets engage the wheel axle lifts the pivot junction off the floor and transfers the load on the truck to the wheels whereby the load may be moved about. A further innovation of the invention includes a catch means which engages the wheel axle when the frame is in an upright position so that the frame will not inadvertently fall backward.

DESCRIPTION OF THE DRAWINGS

FIG. 3 is a cross-sectional view taken along the line 3—3 of FIG. 5 showing the hand truck in the rest position and showing it in cross-section and with the full length of one handle of the frame being illustrated.

FIG. 4 is a cross-sectional view as shown in FIG. 3, showing the lower portion of the hand truck, and showing the frame pivoted rearwardly relative to the wheels, and showing the angular relationship of the frame and toe plate at the time when the load is first transferred to the axle and wheels.

DETAILED DESCRIPTION

Figure 1:
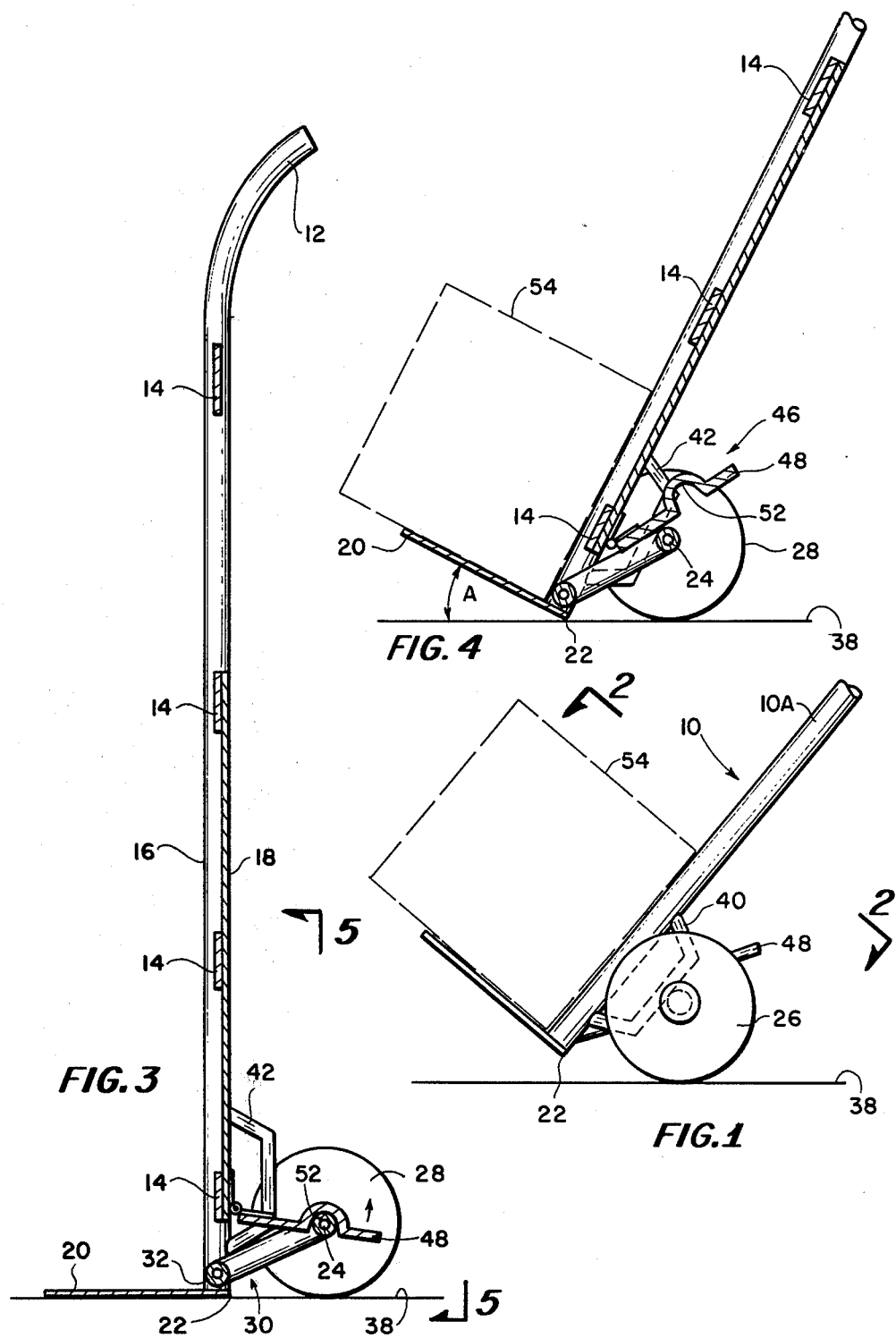
FIG. 1 is a side elevational view of the lower portion of a hand truck according to this invention having a load supported thereon and showing the frame of the hand truck tilted rearwardly so that the weight is substantially supported by the wheels and permitting the operator to move the load about.
Figure 2:
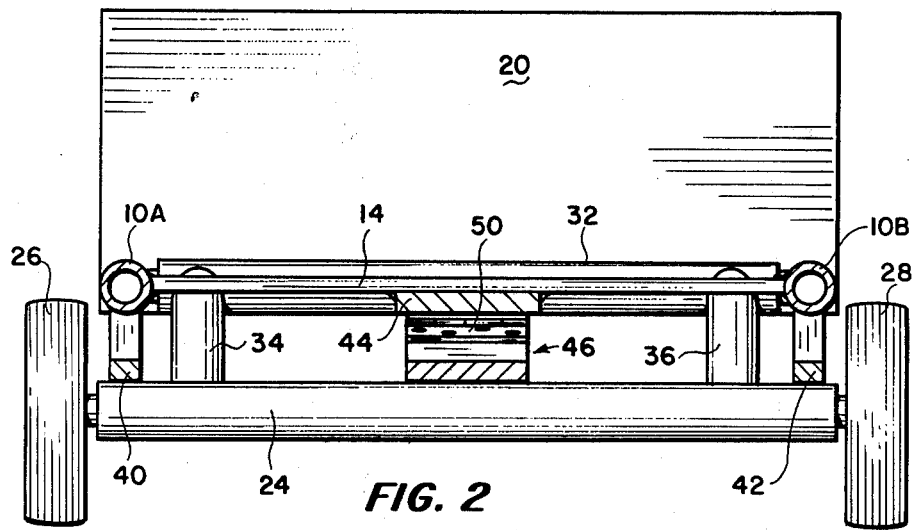
FIG. 2 is a cross-sectional view taken along the line 2—2 of FIG. 1, the load not being shown.
Figure 5:
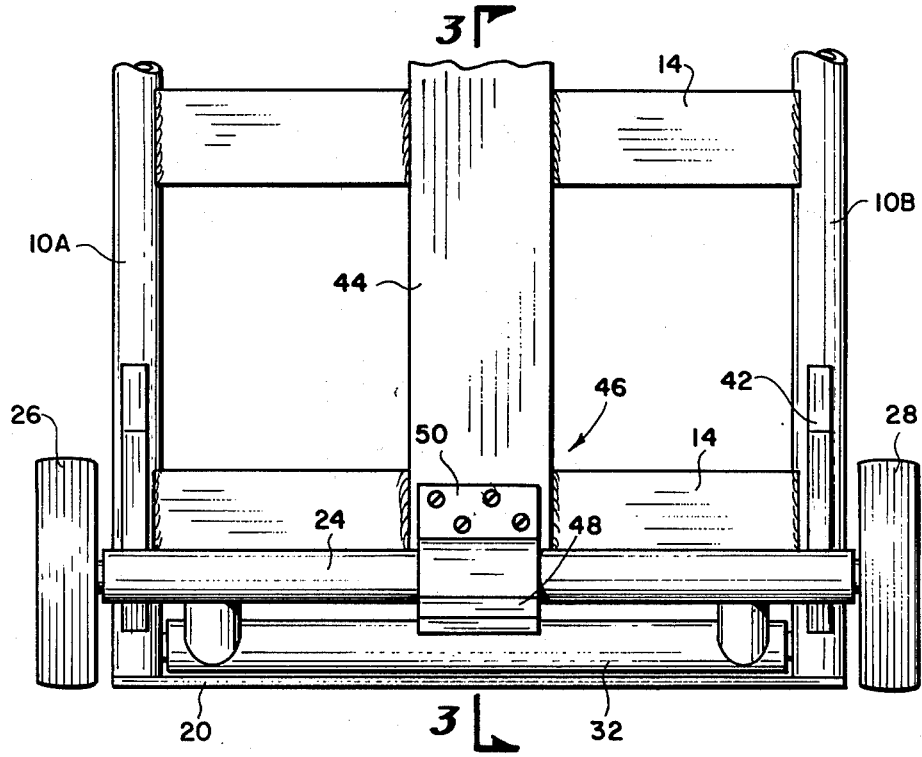
FIG. 5 is a rearward view of the lower portion of the hand truck taken along the line 5—5 of FIG. 3.

Referring to the drawings and first to FIGS. 1 and 2, the lower end of a hand truck is shown. The hand truck includes a frame generally indicated by the numeral 10. The frame consists essentially of spaced apart parallel side members 10A and 10B which may be tubular as shown or of other structural configuration. The side members 10A and 10B extend upwardly and terminate in curved portions serving as handles 12 as shown in FIG. 3. Extending between the parallel side members 10A and 10B are horizontal frame plates 14 which support loads placed on the truck. The specific construction of the side members 10A and 10B, handle portions 12, and the structural member 14 are illustrated by way of example only, and the frame may be constructed in a great variety of different ways which are not material to the present invention. The frame 10 may be constructed of steel, or other metals, or of wood.

Frame 10 has a forward surface 16 and a rearward surface 18. Extending from the lower end of the frame and forwardly of the frame front surface 16, is a toe plate 20. The toe plate is typically of thin metal adapted to be positioned under loads to be moved. The junction of the lower surface of toe plate 20 and the rearward surface 18 of the frame form a pivot junction 22, the importance of which will be described subsequently.

An axle 24 has wheels 26 and 28 at the opposite ends. The axle 24 is supported in pivoted relationship to the lower end of the frame 10 by an arm means generally indicated by the numeral 30. In the illustrated arrangement, the arms means includes a tubular portion 32 which is pivoted between the lower ends of the side members 10A and 10B. Extending from tubular portion 32 are structures 34 and 36. Thus the axle 24, the tubular portion 32, and structures 34 and 36 are formed together as a unitary element providing the arms means 30. The pivoted relationship of the axle 24 to the frame means that wheels 26 and 28 are always in engagement with the floor surface 38.

Affixed to the frame rearward surface 18 are brackets 40 and 42. These brackets engage the axle 24 when the frame upper end is pivoted rearwardly towards the wheels a preselected angle. FIG. 4 shows the relationship of the frame to the floor surface 38 when brackets 40 and 42 first engage axle 24.

As illustrated in FIGS. 2, 3, 4, and 5, the frame includes a central plate 44 which is affixed to the horizontal structural members 14. Pivotally attached to plate 44 is a catch means generally indicated by the numeral 46. The catch means includes, in the illustrated arrangement, an arm 48 which is attached at its inner end by means of a hinge 50 to the center plate 44. Adjacent its outer end the arm is bent to provide a notch 52 which is dimensioned to receive axle 28. When the truck frame is in an upright position with toe plate 20 parallel to floor surface 38, as shown in FIG. 3, the arm notch 52 engages axle 24 to hold the frame uprightly and prevent the frame from inadvertently tilting rearwardly, thereby providing a safe storage means. When the operator desires to tilt the frame rearwardly, he can disengage the catch means by pushing the outer end upwardly with his toe.

OPERATION

The essence of this invention is the arrangement wherein the toe plate 20 is pivoted about junction 22 for a preselected angle before the weight of the load is shifted to wheels 26 and 28. Reference to FIG. 4, the angle A is preferably between 15° and 35° when brackets 40 and 42 first engage axle 24. A most preferred arrangement is achieved when angle A is about 25°. After brackets 40 and 42 engage axle 24, further pivotation towards the attitude as shown in FIG. 1 shifts the load 54 so that it is fully supported by the wheels 26 and 28. It can be seen that the center of gravity of load 54 is shifted rearwardly a significant amount about pivot 22 before the full weight is applied to axle 24. Since the moment arm of the center of gravity of weight 24 relative to pivot junction 22 is much shorter than it is relative to axle 24, it means that much less force need be applied to the handle 12 of the frame to pivot the truck rearwardly. At the same time, it can be seen that the operator does not need to place his foot against the axle 22 to prevent the frame from moving rearwardly when the handle is first pivoted rearwardly since the non-sliding contact of junction 22 with floor 38 will not permit the truck to move rearwardly.

Thus, the truck of this invention provides a superior apparatus for positioning under a load to be moved, requiring the operator to apply a significantly less force to lift a load and to move it about and with improved safety since there is no danger that the truck will move rearwardly when the handles are pivoted rearwardly as the load is first shifted onto the truck.

While the invention has been described with a certain degree of particularity, it is manifest that many changes may be made in the details of construction and the arrangement of components without departing from the spirit and scope of this invention. It is understood that the invention is not limited to the embodiment set forth herein for purposes of exemplification, but is to be limited only by the scope of the attached claim or claims, including the full range of equivalency to which each element thereof is entitled.

What is claimed is:

1. A hand truck for lifting and moving heavy objects on a floor surface;

a frame having spaced apart handles at the upper end, and having a forward and rearward surface;

a toe plate affixed to the lower end of and extending generally normal of the forward surface of said frame, the toe plate and frame rearward surface forming a pivot junction, the toe plate being adapted to be positioned under an object to be lifted and moved, the pivot junction non-slidably engaging the floor surface when said frame is pivoted rearwardly;

a pair of spaced apart wheels rotatably supported by an axle;

axle arm means affixed to said axle at the outer end and pivotally affixed at the inner end to said frame rearward surface adjacent and above said pivot junction whereby said wheels are pivotally supported to said frame, the axle always being parallel said pivot junction, the wheels thereby always remaining on the floor surface;

support brackets affixed to and extending rearwardly from said frame rearward surface above said pivot junction, said axle engaging the support brackets when said frame is pivoted rearwardly sufficient to pivot said toe plate about said pivot junction at least 15° and not more than 35° relative to the floor surface, whereby further rotation of said frame serves to lift said pivot junction and thereby a load supported on said toe plate off the floor surface; and a gravitationally actuated catch arm pivotally attached to said frame rearward surface at its inner end above said axle arm, the catch arm outer end having an upwardly extending integral U-shaped hook portion which slidably receives said axle when said frame is in an upright position, said hook portion being disengageable from said axle by upward pivotal movement of the catch arm outer end, said catch arm sliding on said axle when said frame is pivoted rearwardly.

* * * * *